Feb. 20, 1951  A. AMES, JR  2,542,789
VIEWING APPARATUS FOR STEREOSCOPIC
REPRESENTATION OF PICTURES
Filed June 3, 1945  9 Sheets-Sheet 1

Inventor
Adelbert Ames Jr
by Andre Lamann
Att'y

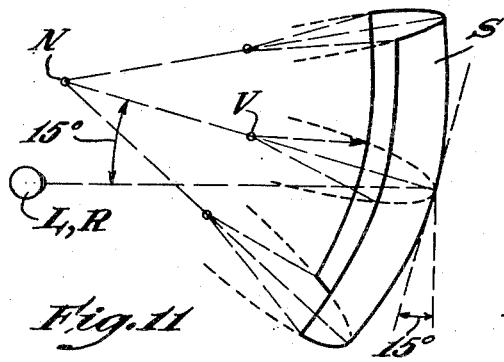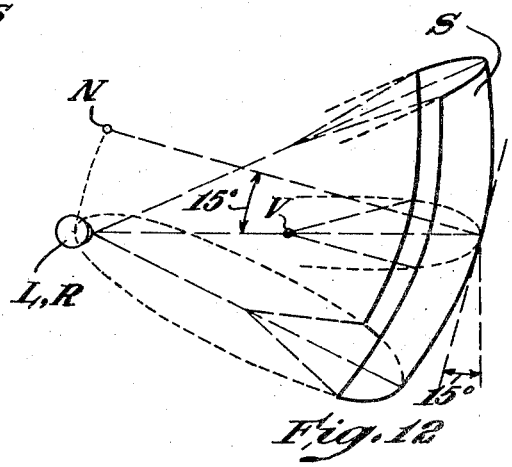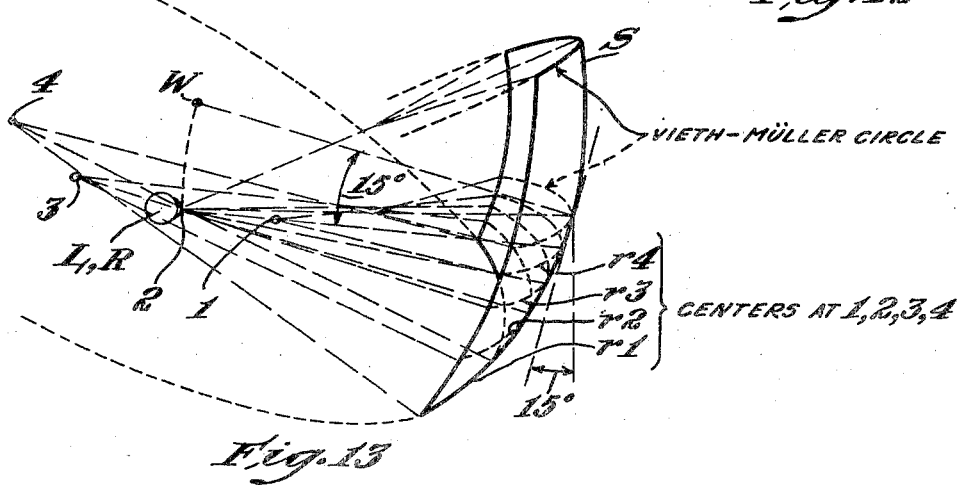

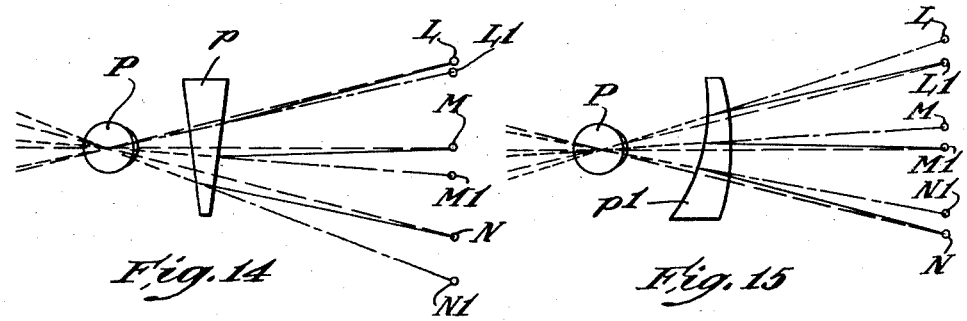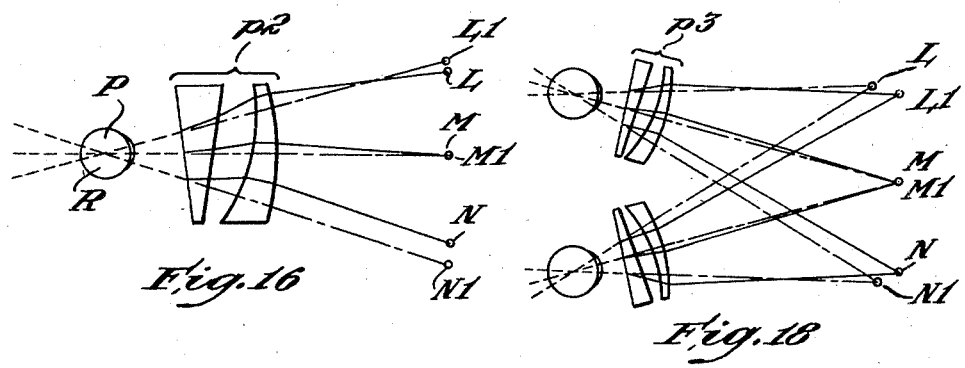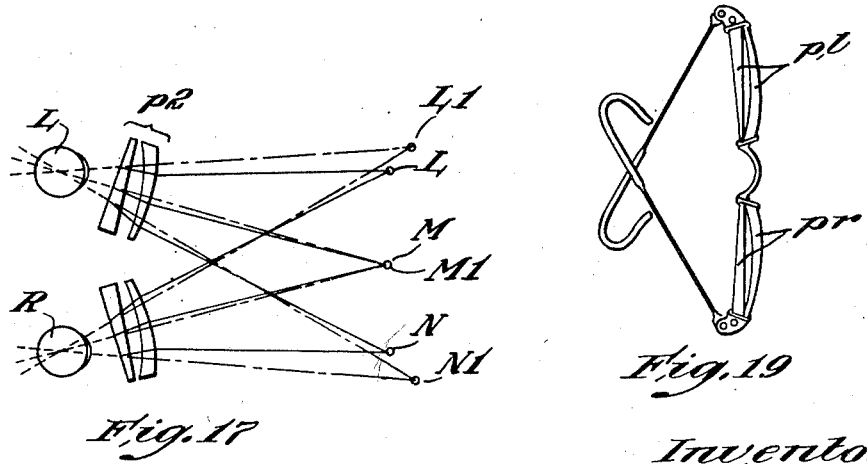

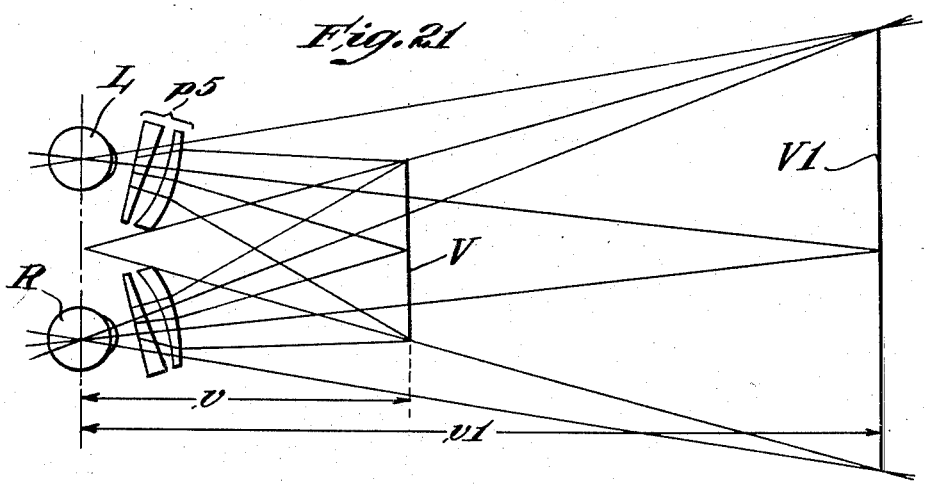
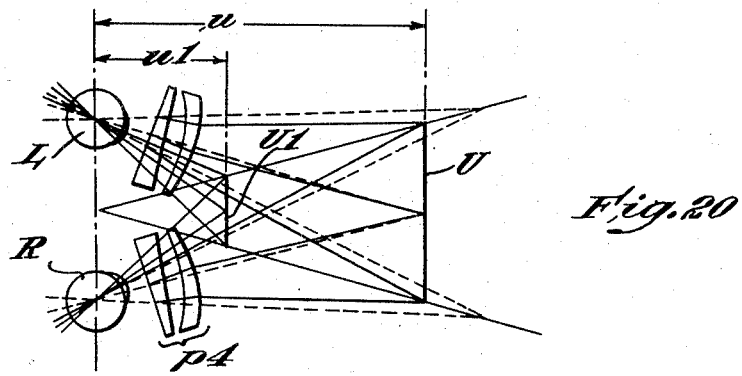
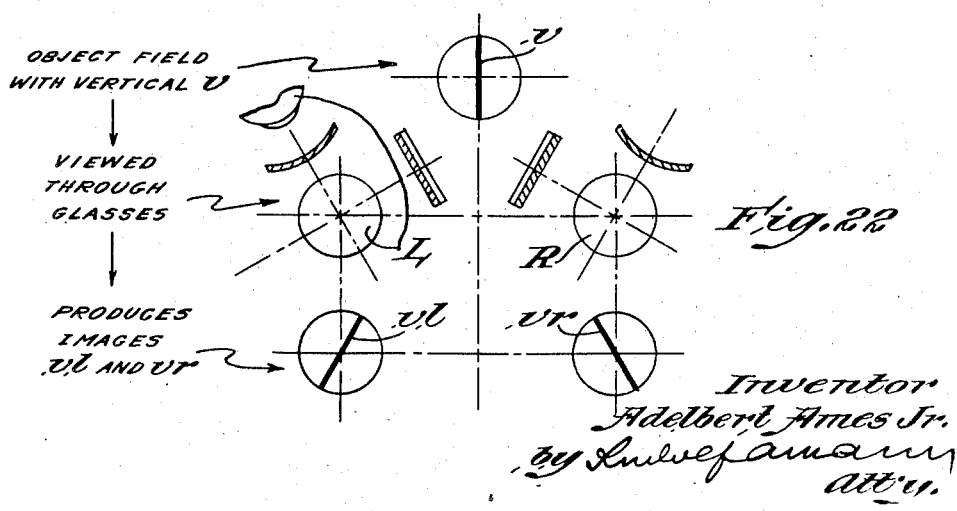

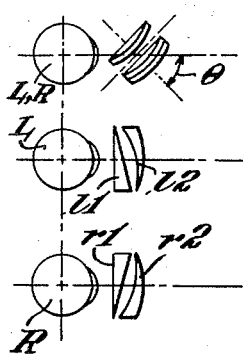
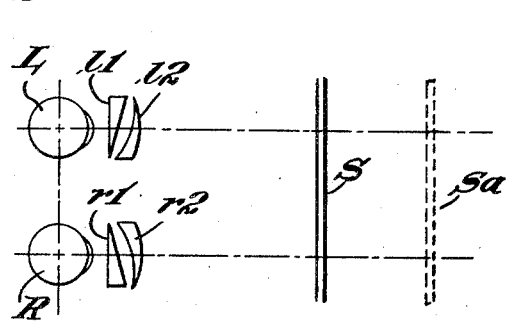
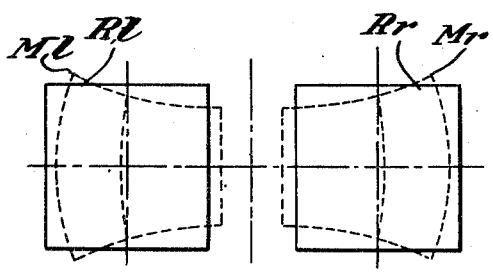
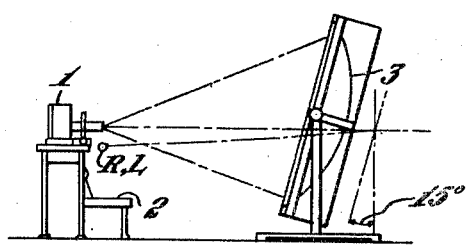
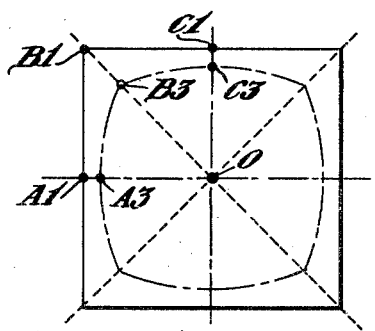
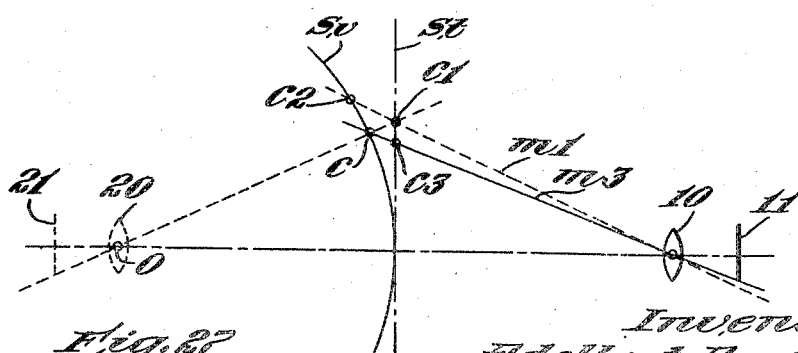

Feb. 20, 1951 A. AMES, JR 2,542,789
VIEWING APPARATUS FOR STEREOSCOPIC
REPRESENTATION OF PICTURES
Filed June 3, 1945 9 Sheets-Sheet 9

Inventor
Adelbert Ames Jr.
by Ludlo Lamann
atty.

Patented Feb. 20, 1951

2,542,789

UNITED STATES PATENT OFFICE 2,542,789

VIEWING APPARATUS FOR STEREOSCOPIC REPRESENTATION OF PICTURES

Adelbert Ames, Jr., Hanover, N. H.

Application January 3, 1945, Serial No. 571,155

5 Claims. (Cl. 88—29)

The present invention relates to the art of presenting two-dimensional pictorial records to an observer in such a fashion that his subjective sensation thereof will include a third dimension in depth.

Heretofore it was thought that subjective experience of true stereoscopic (as distinguished from "pseudoscopic," compare J. Soc. Mot. Pict. Eng., vol. X, pages 331, 336, 338) depth could be produced with two-dimensional records only by presenting to the respective eyes separately, that is mutually exclusive, perceived records which differ from each other in the same manner in which the dioptric images in the respective eyes differ if the corresponding actually three-dimensional scene is observed. In order to accomplish this effect it is necessary simultaneously to present two different records so that each eye perceives only that record which will produce the correct image on its retina. Even the least involved methods of accomplishing this result require rather complicated expedients which exclude truly stereoscopic presentation from many practical uses where simplicity, adaptability, ruggedness and comparatively low cost are indispensible.

It is the principal object of the present invention to provide a method, and appartus for carrying out that method, of producing truly stereoscopic depth sensation, which are simple, reliable and inexpensive, and yet amply effective for many purposes. Other objects are to provide a technique to produce truly stereoscopic depth sensations, with proper apparent distance and depth separation, from records that are actually presented at a distance which is closer than that at which some of the objects of the record should appear such, such records being for example television pictures, dioramas, or projected photographs such as motion pictures of scenes to appear at distances greater than the screen distance; to provide analogously a technique to produce truly stereoscopic depth sensations with proper apparent distance and depth separation, from records actually presented at a distance which is farther than that at which some of the objects of the record should appear, such records being for example pictures of objects to appear as close-ups when viewed from a comparatively greater distance, or motion pictures of close-ups. In still another aspect, additional objects of the invention are to accomplish this result with comparatively simple means such as a projection screen having a particular specifically predetermined but easily applied curvature, upon which screen conventional pictures are projected and observed without any special viewing aids; or these results can be accomplished with comparatively simple eye glasses which do not introduce bothersome discoloration or light absorption and through which a conventional record on a flat screen is observed.

This simplified technique of stereoscopic presentation is based on the principle that definite and true depth discrimination may be induced by the differentiating disposition of some characteristical form elements in the respective dioptric images, irrespective of their position on the retinas. My investigations have shown that there are two main factors of such disposition that determine the apparent absolute and relative distance at which things are seen and on which a simple stereoscopic viewing technique can be based.

There is on the one hand the unsymmetrical lateral shifting of the rays reaching the eyes on the nasal and temporal side, respectively, as the observer looks at similar objects at different distances. This shift is primarily a purely physical phenomenon, but a physiological effect, the so-called Hering-Hillebrand deviation, is superimposed thereon.

On the other hand, the characteristic form pattern on the retina is affected by a physiological change in the relative rotatory position of the eyes which position not only varies with the distance of the observed object, but also with the vertical angle of observation. These phenomena will be explained more in detail hereinbelow with reference to explanatory drawings.

The present invention utilizes these phenomena by presenting to the observer a single record in such a manner that its dioptric images in the respective eyes differ in the above-mentioned respects in a manner which corresponds to a preselected distance at which the object is to appear, whereby the apparent distance of an object in the record can be selected at will independently of the actual visual distance of the record, and all objects will appear at their properly differentiated distances.

These and other objects, aspects and features of the invention will be more fully apparent from the following description of its underlying theory as conceived at this time and of several practical embodiments thereof illustrating its genus. The description refers to drawings in which Fig. 1 is a diagram illustrating the variation with distance, of the asymmetry of the corresponding images in a pair of eyes;

Figure 4:
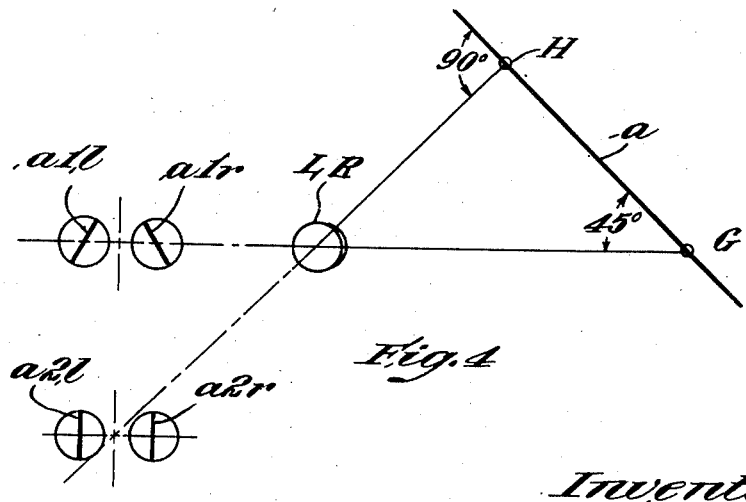
Figure 5:
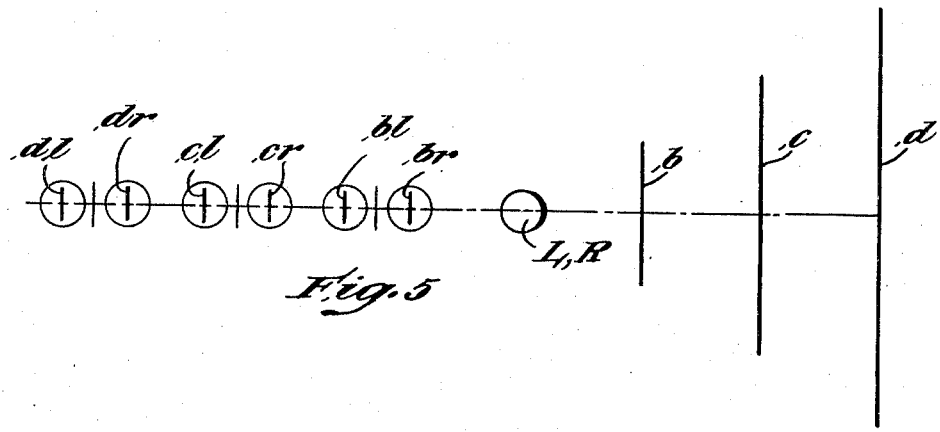
Figure 6:
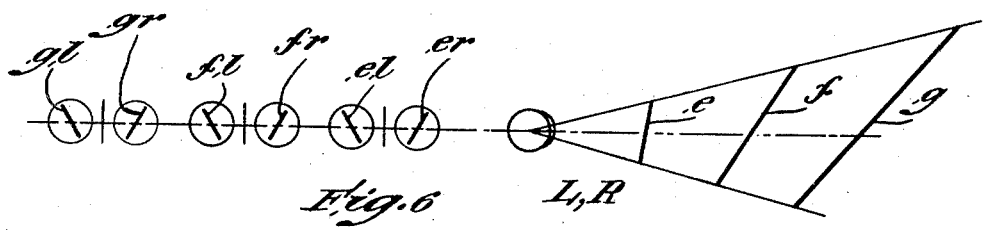
Figure 7:
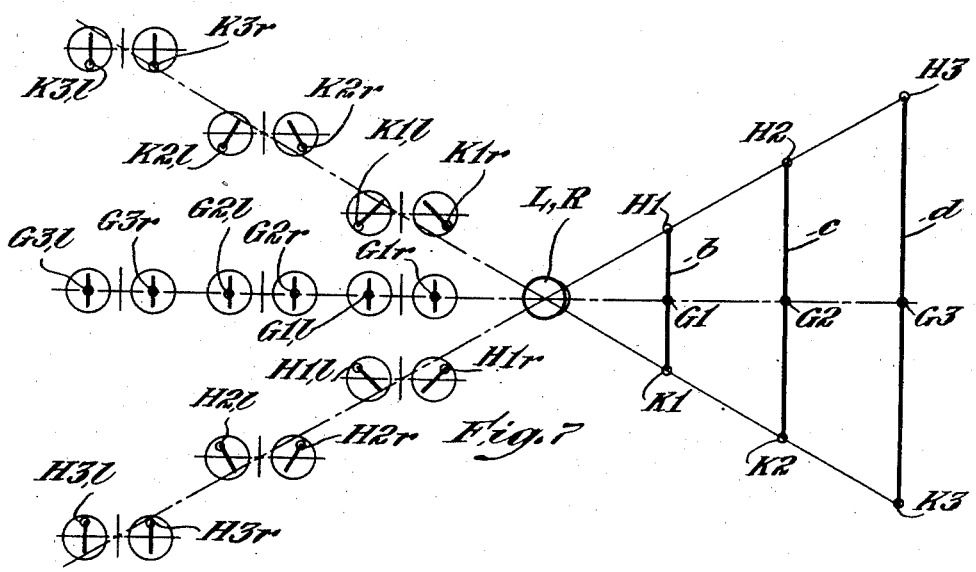
Figure 8:
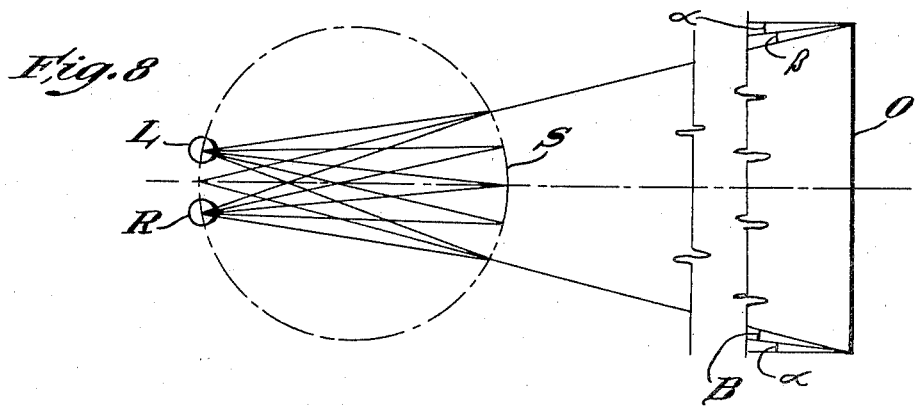
Figure 9:
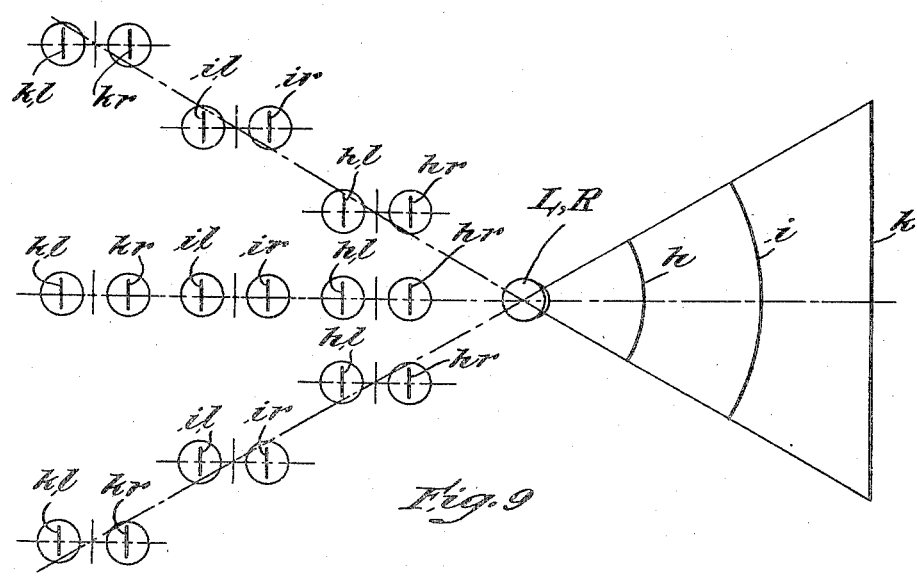
Figure 10:
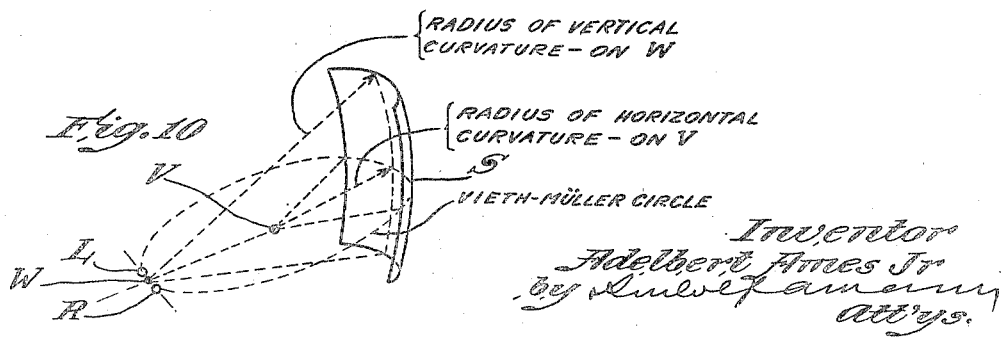
Figure 29:
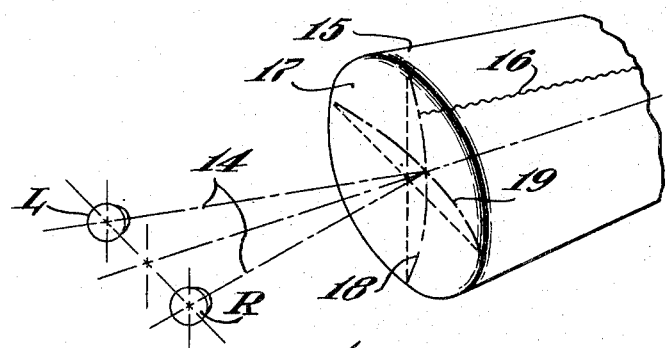
Figure 30:
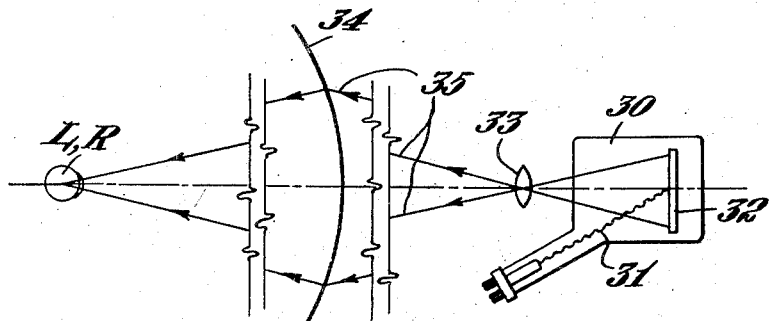
Figure 31:
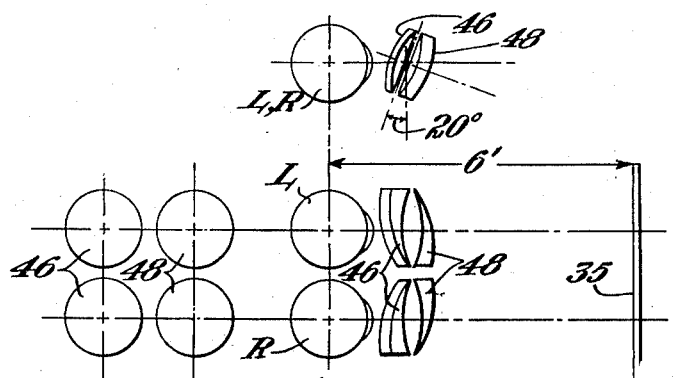
Figure 32:
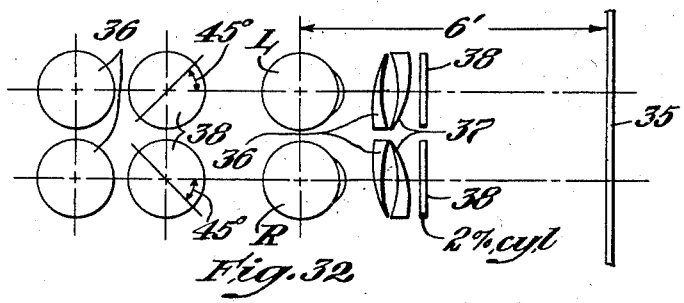
Figure 33:
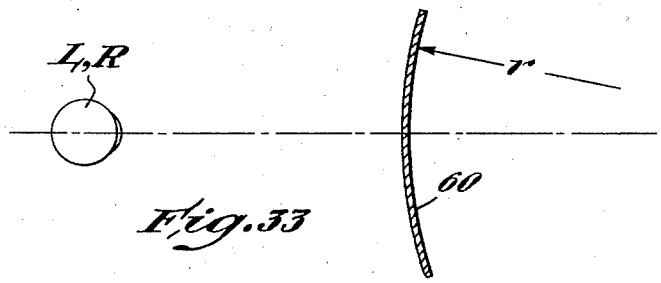
Figure 34:
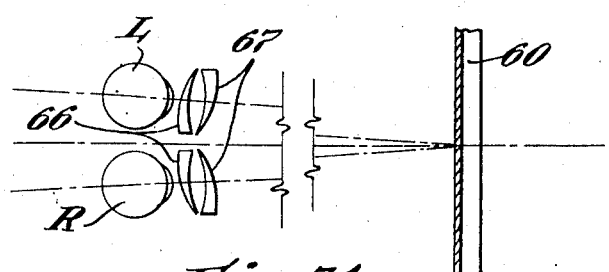

Figs. 4, 5, and 6 are diagrams indicating the equivocal relation of the retinal images of a tipped object;

Fig. 7 is a diagram indicating the manner in which the relation of the retinal images for different directions of gaze furnishes a basis for verticality and distance perception;

Figs. 8 and 9 are diagrams illustrating the horizontal and vertical curvatures, respectively, of pictures made according to the invention;

Fig. 10 is an axonometric view of a picture constructed according to principles explained with reference to Figs. 8 and 9;

Figs. 11 to 13 are views similar to Fig. 10, and illustrate modifications of pictures according to Fig. 10;

Figs. 14 to 18 are diagrams of prismatic lens systems utilized in connection with the invention;

Fig. 19 is a top view of spectacles incorporating lens systems according to Fig. 18;

Figs. 20 and 21 are diagrams illustrating the effect, according to the invention, of prism systems according to Figs. 17 and 18;

Fig. 22 is a diagram illustrating the effect of oblique axes meridional size lenses in viewing systems according to the invention;

Fig. 23 is a schematical horizontal and vertical section through observation lens systems according to the invention;

Fig. 24 is a similar horizontal section;

Fig. 25 is a diagram illustrating the image distortion caused by an optical system according to Fig. 24;

Fig. 26 is a diagrammatic view of an arrangement for projecting pictures on a screen curved in accordance with the invention;

Fig. 27 is a diagram illustrating projection of pictures from the rear on screens such as described with reference to Fig. 26;

Fig. 28 is a diagram illustrating the projection lens or record distortion introduced, in accordance with the invention, in systems according to Fig. 27;

Fig. 29 is a diagram illustrating a television tube having a transmission screen shaped according to the invention;

Fig. 30 is a diagrammatic representation of a television viewing system with rear projection, arranged according to the invention;

Figs. 31 and 32 are diagrams illustrating viewing systems with image-distorting lens systems according to the invention; and Figs. 33 and 34 are a vertical and horizontal schematical section, respectively, of a viewing system according to the invention, combining a curved screen with viewing spectacles.

In order to clarify certain psychophysiological concepts, in terms of which the present invention must necessarily be explained, some aspects of the theory of depth perception will first be shortly presented.

It is generally assumed that a person with normal vision who converges and focuses his eyes upon a center of attention of his object field receives, as far as binocular vision is concerned, two images which are related in three different ways. A first field zone at the center of attention is identically imaged at both foveas. A second adjacent field zone surrounding the first zone appears single and with depth differentiation although its optical images are geometrically dissimilar in the manner of two central projections of the observed object field with the location of the centers of projection corresponding to the lateral separation of the eyes. This is assumed to be so because the respectively stimulated retinal elements lie within corresponding fusional areas. The elements themselves are assumed to have directional values relative to those of the foveal elements which values define very exactly the ratios of lateral and depthwise distances of the respective object elements relatively to the foveally seen elements. A set of third zones can be seen only with one respective eye. It will be evident that, according to these concepts, the above mentioned geometrical dissimilarity alone provides a basis for relative depth perception only and could not possibly furnish any experience of absolute or definite distance of details of the object from the observer.

As shortly mentioned above, the investigations which supplied the theoretical basis for the present invention have shown that although true and absolute depth discrimination, that is definite distance of the objects from the observer, can not be derived from a difference of the two dioptric images which is in every substantial respect the difference of two central projections of the observed object field, such true depth perception, or sensation of three-dimensional space is based upon the characteristic relative directional disposition of the detail of objects of known form, irrespective of the absolute relation of the images of the same detail on the respective retinas. For example, as will be explained more in detail hereinbelow, if in images of objects of known form, the temporal portions are relatively larger than the nasal portions, these objects will be seen farther than objects whose images have nasal portions larger than temporal portions, in either case regardless of the exact projectional relation of the images.

For present purposes it is immaterial to speculate on the logical conclusion from these phenomenological facts, namely that depth perception is most likely an experientially psychological rather than innately physiological phenomenon. That much might, however, be said, that a distinction between "psychological" uniocular and "physiological" binocular space perception, (based for example on the doctrine of "corresponding points") is hardly tenable. At the level of consciousness, the absolutely interchangeable, mutually dominating and largely coexisting factors of uniocular and binocular depth perception must be necessarily of the same nature, although of course the discriminatory physiological mechanism of binocular depth perception is innate in the sense of the innateness of uniocular pattern (light—dark, and color) discrimination.

The above-mentioned general dissimilarity sources of binocular depth perception, which are of two-fold nature, must be discussed at some length in order to convey an understanding of the generic aspect of the present invention.

*Geometrical dissimilarity sources of depth perception; asymmetry*

Figure 1:
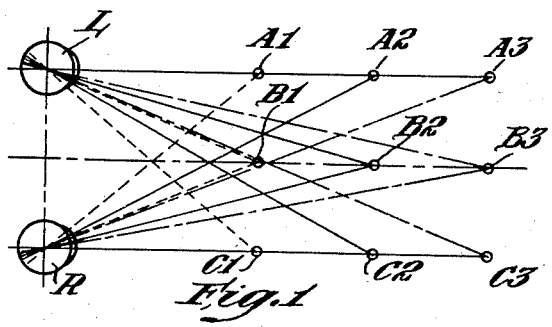

The term asymmetry is used to denote the characteristic relationship of the angles of direction of the ray bundles impinging on the respective eyes. Fig. 1 shows that the angles (such as A1—L—B3) subtended by rays from the temporal object field (that is the field adjoining the observer's temples) become progressively larger than those (such as C1—L—B1) subtended from equally large portions of the nasal field (that is the central field) as an object group approaches the observer's eyes L, R; only for objects at infinity are the respective angles equal. Obviously, angle A1, L, C1>A2, L, C2>A3, L, C3; A1, L, B1>B1, L, C1; A1, R, B1<B1, R, C1; ... $A\infty LB\infty = B\infty RC\infty$.

An object field as indicated in Fig. 1 may be represented by detail groups A1, B1, C1—A2, B2, C2—and A3, B3, C3 at different distances from the observer's eyes L, R, the distances between the detail points of each group being approximately equal.

Figure 2:
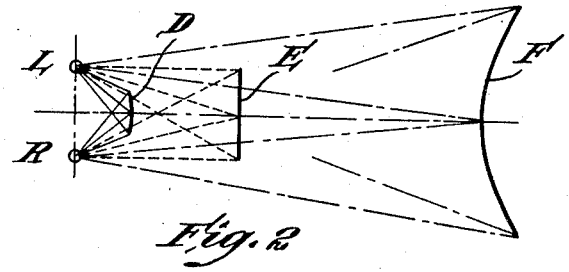
Fig. 2 is a diagram illustrating an instance of objects at different distance having the same asymmetry.

On the other hand, the detail of objects of recognizably different form at different distances may subtend nasal and temporal angles of equal ratios. In Fig. 2, for example, the ratio of the nasal to temporal angles of direction of each of the three objects D, E, F, respectively, is 0.88.

Figure 3:
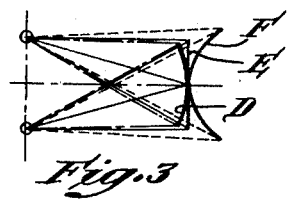
Fig. 3 is a diagram illustrating an instance of objects at the same distance having different asymmetry.

Still further, as shown in Fig. 3, objects at the same distance may have different ratios of nasal to temporal angles of direction if they are of different form. The respective ratios of shapes D, E, F of Fig. 3 are for example 0.667, 0.88 and 0.972 respectively.

*Functional physiological dissimilarity sources of depth perception*

This term is used to denote characteristic relations of corresponding elements of the two dioptric images as determined by physiological changes that take place in the eyes when the position of the eyes in their orbits changes. These relationships can be grouped into those that affect the above-discussed asymmetry, mainly the so-called Hering-Hillebrand deviation, and those that affect the rotational or cyclo relation of the two eyes.

1. *Hering-Hillebrand deviation.*—This deviation causes, with distant vision, the temporal portions of the dioptric images to appear relatively larger than the nasal ones, and with near vision the nasal portions to appear relatively larger than the temporal ones, than should be expected from the purely physical asymmetry. This phenomenon is illustrated by the apparent variation in the curved appearance of the frontal plane horopter, as explained in Ames, Ogle and Gliddon, J. Opt. Soc. of Amer., vol. 22, 1932, pp. 600 et seq. Due to the Hering-Hillebrand deviation, the empirical horopter curve lies for near distances between the Vieth-Müller horopter circle and the frontal plane, coincides for about 2 meters with the frontal plane, and is convex for greater distances.

2. *Cyclo deviation.*—This deviation can be subdivided into two distinct phenomena, namely the change in cyclo position of the two eyes with changes in distance of vision, and the change in cyclo position with the eyes looking up and down.

With distant vision there exists a slight excyclo rotation of the eyes which does not substantially change when the eyes look up and down over the object field. With near vision this cyclo disposition increases up to about 1.250% in each eye, for a fixation distance of about 40 cm.

When the eyes look up, the above excyclo disposition at near vision increases with increase of the angle of gaze and when they look down, it decreases, even going into an incyclo condition with extreme downward gaze.

In this connection it should be noted that (although this assumption is commonly made) there is for a certain fixed direction of gaze no certain and unequivocal relation between the characteristically differentiated cyclo distribution in the impinging ray bundles and, on the one hand the degree of apparent backward and forward tipping of a line in the median plane, and on the other hand the distance of such a line.

One of the reasons for this misunderstanding is the assumption that the convergence of the eyes is very accurately sensed. There are probably clues as to the position of the eyes derived from the propioceptor processes of the extrinsic eye muscles, but these could not possibly account for the degree of accuracy with which we actually experience the tipped position of lines and objects.

The accuracy that actually exists can only be explained on the basis of differentiated retinal pattern stimuli. This pattern differentiation provides perception of tipped positions through synthesis of the pattern variations that take place with the upward and downward turning of the eyes. Without such eye movement, as for instance when we fixate one point on a line, we have very little judgment as to its change in position when it is tipped either actually or by dioptric means, as by so-called cyclo or oblique meridian size lenses or roof prisms.

It is true that, as above discussed with reference to Figs. 1 to 3, the purely physical effect of asymmetric incongruity relationships in the ray bundles (characteristically differentiated in accordance with the relation between object and observer) is directly related to the apparent distance or curvature of surfaces in the median plane. But this is so only because those relationships are not affected by the elevation of the eyes. The physical cyclo relationships in the impinging ray bundles cannot be directly related to the apparent degree of forward and backward tipping of a line in view of the fact that characteristic differentiations of the cyclo relationships of the physiological stimulus patterns are different with different elevations of the eyes.

Thus, the degree of tipping of a line at a given distance is not unequivocally related to a particular declination of its images to the vertical retinal meridians. This declination of the images will all depend on what part of the line is observed, as will be evident from Fig. 4. If the eyes are in the primary position looking at the point G on a line $a$, the images will have a certain declination to the vertical retinal meridians as indicated in the image diagrams behind the eyes, showing the images $al1$, $ar1$ in the left and right eye, respectively. But, if the eyes are elevated to look at the point H, the images $al2$, $ar2$ will not be tipped to the vertical retinal meridians but will coincide with them.

Similarly, there is no physically predetermined relation between the cyclo disposition of the dioptric images and the distance of a tipped line; for example, all verticals have the same image relation regardless of distance as shown with regard to verticals $b$, $c$, $d$ in Fig. 5, and a less tipped line $e$ at near distance will produce the same cyclo relation of the images as a more tipped line $g$ at far distance, as will be evident from Fig. 6.

While with fixed direction of gaze, the purely physical cyclo relationships in the impinging ray bundles do not provide a basis for determining the verticality or distance of a line, such a basis is provided, as mentioned above, if the gaze, instead of being fixed, travels up and down the line. The reason for this is shown in Fig. 7, which combines Figs. 4 and 5.

In Fig. 7, the declination of the images to the vertical retinal meridians will depend upon the location of the part of the line that is observed, in accordance with the elevation or depression of the eyes in their orbits. If the eyes are looking straight ahead in the direction of point G3, the images will coincide or be parallel with the vertical retinal meridians, compare G3l and G3r. If they are looking downward in the direction toward K3, the images will be inclined in the vertical retinal meridians as shown at K3l and K3r. If they are looking upward in the direction H3, they will be inclined as shown at H3l and H3r.

If the different types of the declination of the images relatively to the vertical retinal meridians are synthesized, they provide a basis for an exact judgment of the verticality of the line.

Fig. 7 also shows that a similar synthesis of the stimuli from a series of lines at different distances provides a basis for a judgment, not only of their verticality but also of their distance.

Apparent general distance as depending upon asymmetry and cyclo factors

It will now be evident that the apparent absolute distance of a picture as well as the relative distances of the picture detail, viewed at a given distance, depends upon the characteristic differentiation of the dioptric images. If the characteristic asymmetric incongruity and cyclo disposition of the dioptric images is the same that exist when the actual scene is looked at, the scene will appear at that distance. This does not generally happen with ordinary pictures on a flat surface whether projected or permanently recorded. With a flat surface this agreement between actual and apparent distance occurs only when the object field depicted is a plane surface and when the picture of the field is also on a plane surface and viewed from the same distance as the object field.

If the objective field is more distant than the viewing distance of its picture, the asymmetric incongruity relationship of the rays of the bundles impinging on the two eyes from the flat picture plane will be different than that of bundles coming from the actual, distant object field. When viewing the picture of a scene taken at a greater distance, the angles subtended by the rays from the external temporal fields will be greater than those from the nasal external fields while, when viewing the actual scene, they will be equal or the nasal external angles will be greater. Or, if the distance at which the picture is viewed is greater than that of the object, the reverse will be the case. Further, the cyclo disposition of the radiation impinging from the picture relative to that received from the corresponding actual objective field will vary according to the variation in cyclo disposition of the relative parts of the dioptric images as outlined above.

Viewing systems according to the invention

In accordance with the present invention, the above-mentioned conditions for producing a subjective appearance of an object field presented by a picture, at a predetermined subjective distance other than the actual distance at which the picture is viewed, are provided by controlling the relations of the respective retinal images, such that they induce the same types of retinal pattern relation that would exist if the observer were looking at the actual scene. This control can be carried out in different ways, of which the most important and practical are the use for observation with free eyes, of picture surfaces, including projection screens, that are curved in a certain predetermined way, or observation of pictures on flat surfaces through special optical systems. In some cases, both ways may be combined to provide the desired overall effect. Each of these possibilities will first be generally discussed, before practical embodiments thereof are described.

1. *Curvature and positioning of the picture surface.*—Where the depicted actual field of view is a distant one and the picture is to be viewed from a near distance, use is made of the fact that the relative disposition of the rays within bundles from a distant scene is such that the rays from the temporal external fields subtend at the respective eyes the same or greater relative angles as those from the nasal external fields. A picture presented for observation at a given distance will produce similar equal angles if its surface is in its horizontal sections curved on an appropriate circle.

It should be understood that, in this context, the term "infinite distance" is used for any distance beyond which image differences become psycho-physiologically ineffective, that is beyond about 300 to 400 feet.

If the original field of view is a near one and the picture of it is to be viewed from a greater distance, in order to produce the same asymmetric incongruities as the object field, the picture must have a horizontal convex curvature determined by the relative distance of the object and the picture. The curvature is determined according to the principles explained with reference to Figs. 1 to 3.

It will now be evident from Fig. 2 that, generally speaking, an object field at E will have to be depicted as a concavely curved record D at a distance $\overline{RD}$ smaller than $\overline{RE}$, if the ratio of nasal and temporal angles is to retain its comparatively large value (approaching unity) thus causing the record to appear at the desired distance $\overline{RE}$ greater than the record distance $\overline{RD}$. If distance $\overline{RE}$ is practically infinite (that is about 300 to 400 feet or more), with the above-mentioned ratio actually unity, the concave curvature is that of the Vieth-Müller circle.

On the other hand, an object field at E will have to be depicted as a convexly curved record F distance $\overline{RF}$ greater than $\overline{RE}$, if the ratio of nasal and temporal angles is to retain its comparatively small value (receding from unity) thus causing the record to appear at the desired distance $\overline{RE}$ smaller than the record distance $\overline{RF}$.

Referring by way of example especially to the presentation of an infinitely distant scene by a near record, and referring also to the above definition of the Vieth-Müller horopter circle, Fig. 8 shows that, in order to preserve the one to one ratio of nasal and temporal directional angles, characteristic of infinitely distant scene O, this scene has to be presented as picture S on a surface which is horizontally curved on the Vieth-Müller circle of an object at the distance at which the surface S is presented to eyes R and L.

The above deals with the purely geometrical or asymmetry aspect of characteristic image relation. Coming now to the functional physiological aspects, the Hering-Hillebrand deviation will first be discussed, which deviation is not taken care of by the above alterations in the horizontal curvature of the picture surface.

To account for the Hering-Hillebrand variation, the curvatures in the horizontal meridian have to be modified. Where distant objective fields are pictured at a lesser viewing distance, the concave curvature has to be greater by a factor due to the Hering-Hillebrand deviation; where the object field is nearer than the distance at which it is pictured, the convexity of the surface has to be increased beyond the amount necessitated by the geometrical image asymmetry.

Coming now to the cyclo aspect of the characteristic physiological image dissimilarities, in order that the picture shall produce the same cyclo incongruities as an actual scene, certain curvatures in the vertical meridian must be introduced.

As pointed out above, with a distant view there exists practically normal cyclo relation of the two eyes, which does not change when the eyes look up and down over the field. When nearer objects are observed, the excyclo condition increases as described above; when looking up over the field the excyclo condition increases and when looking down it decreases and goes into an incyclo condition.

In order to duplicate this condition for roving eyes (which might also be referred to as a dynamic condition), if the picture of a distant field of view is to be presented at a nearer distance, the near picture that is to produce the same cyclo disposition as the distant scene must be put on a surface concave in the vertical meridian. If the curvature of the surface is on the arc of a circle about the eyes as a center, it will approximately reproduce the desired condition, as will be evident from Fig. 9. In this figure, $h$, $i$, and $k$ are median lines at near, intermediate and infinite distance, respectively. As indicated at the left-hand side of this figure, the cyclo relation does not change in this case, since the direction of gaze remains normal to the lines which are circles around the eyes as center.

This vertical curvature of a near screen S, the surface S of Fig. 8 as above described, for presenting distant scenes is indicated in Fig. 10; the resulting toric configuration of this screen will now be understood without further explanation.

Due to the greater excyclo condition at near with the eyes in primary position (which might also be referred to as a static condition), the appropriate image relation is more accurately reproduced if the center of curvature is elevated above the eyes by the proper amount, which means that the top of the picture screen is tipped back as shown in Fig. 11. For apparently infinite objects, a picture screen viewed at about six feet should be tipped back about 15°.

As a comparison of Figs. 11 and 12 will show, mere tipping of the screen would falsify the curvature taking care of the physical image relation, with the Vieth-Müller circles centered at point N instead of at the eyes. The correction indicated in Fig. 12 takes care of this condition. As shown in Fig. 12, this improved modification puts all horizontal curves on Vieth-Müller circles.

Coming back to dynamic conditions, the correction according to Figs. 11 and 12 does not take care of the variation in the cyclo relation when looking up and down, where the actual scene is a distant landscape including the surface of the ground from the distance to the nearer middle ground. For such objects, a screen of the type shown in Fig. 13 is still more effective. For the sky and the distance the curvature of this screen should be the same as that in Fig. 12, but in the lower part the radii of the Vieth-Müller circles should be increased to produce the same asymmetric disparity as would be produced by nearer surfaces, as clearly indicated in Fig. 13.

Where a near object field is depicted in a picture to be viewed from a greater distance, the curvature of the picture plane in the vertical meridian should be less concave, under certain conditions becoming convex, and the top of the picture plane tipped forward instead of back.

2. *Observation of pictures through glasses that alter the asymmetric incongruities and cyclo relationships.*—The above-described alterations in asymmetric incongruity and cyclo relation of the dioptric images, produced by curvature and positioning of the picture plane, can also be brought about with properly designed lenses that alter the asymmetric incongruities and cyclo dispositions to the desired amount.

The desired amount of physical asymmetric incongruities in the horizontal meridian can be produced by prism combinations of the type described in Patent No. 2,118,132, dated May 24, 1938, which will now be shortly described for the present purpose.

As shown in Fig. 14, rays from object points LMN (where angle $LPM$=angle $MPN$) passing through a flat prism $p$ converge on principal point P of an eye R from different directions, as indicated with full lines, than rays from the same object points freely, without prism, as indicated in dotted lines. Their direction is as if they came from points Ll, Ml, Nl shifted towards the apex of the prism, as indicated with dot-and-dash lines, those passing nearer the base of the prism being shifted less than those that pass nearer the apex.

As shown in Fig. 15, the direction of rays passing through a prism $pl$ ground on a base curve of about nine diopters is also altered as if they came from directions shifted towards the apex of the prism, but rays passing near the base are shifted the same amount as those that pass near the apex.

Now if a flat prism as shown in Fig. 14 and a curved prism as shown in Fig. 15 are combined base to apex as shown in Fig. 16, the direction of rays from object points LMN passing through this prism combination $p2$ will be as shown in Fig. 16. The direction of the axial ray from M is not altered. The direction of the ray from L is shifted a given amount upward and that from N a greater amount downward, so that the angle NlPM is rendered relatively larger than the angle LlPM.

If pairs of such combinations with the bases of the flat prisms toward the nose (see Fig. 17) are placed before the eyes, their effect on impinging rays is to increase the angles of the rays from the temporal field of each eye relative to those from the nasal field, or to decrease the size of the dioptric image on the temporal side relative to that on the nasal side.

If the bases of the flat prisms are towards the temples (see Fig. 18), the effect will be to decrease the angles of the rays from the temporal field of each eye relative to those from the nasal field, or to increase the size of the dioptric image on the temporal side relative to that on the nasal side.

Fig. 19 shows a pair of practical spectacles made with prism systems $pl$ and $pr$ according to Fig. 18 for purposes of the invention. The effect of such glasses upon depth perception will now be explained with reference to Figs. 20 and 21.

In Fig. 20, a frontal plane U at a given distance $u$ may represent an object field with characteristic detail. If this field is viewed through lens system $p4$ with the base of the flat prism on the inside, the directional angle relationship of the ray bundles will be so changed that the object field appears as $U1$, at the reduced distance $u1$. Hence, if the picture of an object desired to be experienced at distance $u1$, is placed at U and viewed through system $p4$, it will have the appearance of an object field $U1$ at the nearer distance $u1$.

Analogously, as indicated in Fig. 21, if an object field V at distance $v$ is observed through a prismatic system $p5$ with the bases of the flat prisms on the outside, the ray bundle angles will be so changed that object V appears as $V1$ at the greater distance $v1$. Hence, if the picture of an object desired to be experienced at distance $v1$, is placed at V and viewed through system $p5$, it will have the appearance of an object field $V1$ at the farther distance $v1$.

It will now be evident that by properly selecting the prismatic power of the viewing-lens system, the observed pictures can be made to appear at any desired distance, including infinity for picture as well as apparent object, so far as control of geometrical asymmetry clues is concerned. Specific examples of practical picture-lens systems incorporating this effect will be given hereinbelow.

The above-described effect of prismatic viewing-lens systems according to the invention corresponds to the effect produced by the horizontal curvature of a pictrue observed without special glasses, such as on a projection screen according to Fig. 10.

The cyclo effect connected with the dynamic condition of looking up and down and explained with reference to Fig. 9 can be provided for observation of flat pictures, by means of a distortion inherent in prism systems of the above-described type for controlling asymmetry conditions.

These prism systems cause an apparent bowing of vertical lines quite analogous to the effect, described above with reference to Fig. 10, of the vertical screen curvature upon the retinal images of vertical lines. It will be remembered that this vertical screen curvature affects the retinal images of a person looking up and down a vertical line at a certain distance, in such a manner that the relation of these images is the same as those of images caused by looking up and down a vertical line at a different distance; more particularly the curvature of the screen at finite distance, as described, introduces the image disparity that would be caused by looking up and down a line at infinity. Lenses adapted to produce this effect will now be described with reference to Figs. 23 to 25.

Fig. 23 shows the characteristic horizontal and vertical cross sections through a lens system, for observing a flat picture S of a near scene which is to appear as $Sa$ at a distance nearer than that of the picture, whereas Fig. 24 indicates a lens system for observing pictures S of distance scenes which are to appear as $Sa$ at distances greater than the actual pictures.

Fig. 25 indicates the effect of systems such as illustrated in Fig. 24, showing the retinal images $Rl$, $Rr$ of a square viewed without lenses superimposed on the images $Ml$, $Mr$ of that square as seen through such lens systems. The combination as a whole increases the retinal images vertically on the temporal side; this magnification decreases towards the apices of elements $ll$, $rl$.

The distortion of the verticals, corresponding to that introduced by a vertically curved picture surface, is clearly indicated in Fig. 25. By putting the prisms next to eyes on base curves, the asymmetry effect as well as the vertical curvature can be increased or decreased, in order to provide the proper image relation for any combination of objective and subjective distances. In order to produce the same effect as a screen that is convex towards the eyes, the base-in prisms next to the eyes must be concave towards the eyes in the vertical meridians. In the horizontal meridians these prisms must be convex in order to produce the proper asymmetry disparity. Both conditions can be met by making these prisms elements bitoric or by using a straight prism together with a vertically curved screen. Since the proper asymmetry condition is in most instances a more important factor than the curvature of vertical lines, the vertical curvature can in most instances be omitted.

Coming now to the static cyclo effect which in the case of curved pictures is introduced by tipping the surface as above described with reference to Figs. 11 to 13, this can be provided by means of lens systems in various ways, for example by tipping the prisms about a horizontal axis, as indicated in the vertical cross section of Fig. 23, where $\theta$ is the degree of tipping of the system.

The desired amount of in- or excyclo condition can also be produced by combining with the above-described prismatic lenses, meridional size lenses at oblique axes, of the type described in Patent No. 2,230,993, of February 11, 1931, and now to be explained with reference to Fig. 22.

This figure shows at the top a vertical in the object field, therebelow spectacles composed of meridional zero power size lenses of the shape indicated by way of two cross sections and placed at oblique axes, and lastly the two images of the vertical object line as affected by the oblique axis lenses. It will be evident that any cyclo relationship of the images can be produced with lenses of this type.

Data of practical prism systems of this type will be given hereinbelow with reference to the description of specific embodiments of such lenses.

*Apparent depth within scene*

As so far discussed, the invention provides strictly speaking only for proper apparent localization of a plane, but not for depth differentiation of the detail within a scene at the average distance of that plane. A peculiar aspect of the invention introduces however an additional effect which is operative when the asymmetric and cyclo conditions provided for observation of a picture correspond to those that would exist with vision at the general or average correct distance of the scene.

The characteristic asymmetry and cyclo disparity clues provided by a conventional flat picture observed at a certain distance inform the observer of the exact distance of that picture, and although the details therein may provide geometric perspective, size, over-lay, air perspective, blurring, brightness difference, and other uniocular indications of their absolute and relative localization, these clues will be denied by the asymmetry and cyclo disparity clues of binocular vision that indicate all detail as being located at the distance of the picture surface.

If however asymmetry and cyclo relation that do not contradict the available clues of uniocular depth differentiation are provided by the above-described means of curving the picture surface or by optically modifying the image carrying ray bundles, then the conflict with the uniocular factors is eliminated, the latter are given, so to speak, free reign and full relative and absolute depth localization results.

Generally speaking, this method of differentiating the relative distances of detail applies to any overall or average distance of the depicted scene. It was however found that, if asymmetry and cyclo conditions characteristic of infinity distant (that is beyond about 400 feet) vision are provided, that is if binocular localization is rendered inoperative, marked absolute and relative depth localization is obtained irrespective whether the picture is viewed from a lesser, the same or a greater distance than that of the actual scene; the observer behaves under these conditions as if his binocular vision were inoperative and only the clues provided by uniocular vision available. These uniocular clues are therefore rendered fully effective to provide a basis for localizing the depicted objects in their actual relative positions, in addition to the truly stereoscopic effect of correctly localizing the scene as a whole as to its absolute distance from the observer.

For related reasons, an observation system according to the invention improves the appearance of pictures of distant scenes stereoscopically represented on screens at comparatively close distance. Such pictures often exhibit the so-called silhouette effect and other more or less disturbing distortions of spatial localization. This is due to the fact that the two stereoscopic records of a scene taken from a distance greater than about 400 feet are practically identical and register on the projection screen, constituting what amounts essentially to a single picture. This single picture at near distance is seen with the incongruities characteristic of that distance and causes localization of the screen, with the picture, at its actual near distance. This localization is in conflict with the uniocular depth clues contained in the picture and causes the above-mentioned flatness. If now the image incongruities characterizing the screen and picture as at near distance are removed for example by means of a screen curved in accordance with the invention, the screen is localized at far distance (or at least its actual nearness is not forced upon the observer) and the depth localization clues that are effective beyond the distance which introduces disparity clues, are released to become fully operative with the result that the undesirable flatness of the picture disappears and its effect becomes much more natural.

Still another beneficial effect of the observation technique according to the invention is increased clearness which includes greater apparent brightness and increased detail separation and contrast. This effect is probably due to the elimination of the conflict between binocular and uniocular depth clues which conflict is apt to cause suppression of the binocular clues and hence of the simultaneous contribution of the two eyes, with the consequent loss, somewhere in the intermediate or higher centers of visual perception, of part of the incoming signal. When this conflict is removed and binocular vision fully established, there exists no necessity for suppression and the stimulus pattern is sensorially fully responded to, with the ensuing actually observed clarifying effect.

The theoretical basis and the general practical execution of the present invention having been set forth, it will now be further explained by describing several specific practical embodiments thereof.

*Practical applications*

It will now be evident that it is possible according to the invention to present a single two-dimensional picture record in such a manner that the scene depicted appears either nearer or farther than the actual picture, and that the detail within the scene appears with proper relative depth differentiation, by modifying certain relations of the retinal images of the record either by mechanically curving the picture surface, or by optically modifying the image-producing light rays, or by a combination of these two expedients.

*Picture projected onto front of curved, reflecting near screen.*—Fig. 26 shows an arrangement of this type wherein 1 is a conventional projector, 2 the seat for the observer indicated by eyes R, L, and 3 a screen curved according to the rules explained with reference to Fig. 10, which screen, for example for the purpose of projection in the home of colored slides, may be placed at a distance of six feet. For this projecting distance the circular horizontal curvature will have a radius of about three feet and the circular vertical curvature of about six feet. The centers of curvature are located as indicated in Fig. 26, and the screen is preferably tipped at an angle of 15° as above described with reference to Figs. 12 to 13, and as likewise indicated in Fig. 26.

*Picture projected onto back of curved, translucent near screen.*—It may often be desirable to project pictures from the rear of a translucent screen, for example in the case of dioramas which often provide little or no space in front for a projector and its accessories.

In this instance, the same screen curvatures and the same observation point are to be used. Again, the picture that is projected in this screen from the rear must subtend, with regard to the observer in front, the same angles as the actual scene at the desired apparent distance. This condition would not be fulfilled if the slide and the projection system which are satisfactory for front projection were used for rear projection.

In accordance with the present invention, the proper rear projection image can be produced by distorting the conventional front projection beam in the manner indicated in Fig. 27. In this figure, Sv represents the vertical cross section through a screen curved according to the invention, 10 the objective and 11 the slide or film of a rear projector. 20 and 21 are the corresponding elements of an assumed front projector, and O is the station point of the observer which will coincide with 20. As previously explained, the correct position of a point projected from a conventional front slide 21 is C on Sv, corresponding to C1 on a flat screen Sf. Now if the same slide were projected with the same lens system from the rear, the corresponding picture point would be C2, which is obviously at a wrong position. In order to obtain the desired point C, the rear projection has to provide a point C3 on the flat screen Sf. This result can be obtained in various ways.

According to one aspect of this phase of the invention, a conventional slide, the same as would be used for front projection, is projected from the rear, but with a lens system introducing a barrel distortion corresponding to the deviation of ray $m1$ to $m3$ as indicated in Fig. 27. As can be easily deducted by a simple geometric construction for a number of image points such as A1, B1, C1 of Fig. 28, this distortion has to produce points A3, B3, C3 on the flat screen $Sf$. The design of such a system can be easily carried out with conventional means, once the desired specific distortion is given, as for example in Fig. 28.

According to another aspect, a conventional nondistorting objective is used with a slide whose record is so distorted that, if projected on a flat screen $Sf$, points A3, B3, C3 etc. would be produced. Such a slide can be made by projection printing a conventional nondistorted record through a lens system designed to provide the desired distortion.

In the instance illustrated in Fig. 27, the new slide would have the distortion indicated at A3, B3, C3 of Fig. 28.

It will now be evident that any desired distortion, as for example such as discussed with reference to Figs. 11 to 13, can be introduced either with a distorting rear projection lens specially designed for the curved screen in question, or by analogously distorting the records of rear projection slides or films.

*Television picture on near screen.*—Picture observation according to the present invention offers particular advantages if applied to television. As well known, television pictures are comparatively small and in most practical instances have to be observed from close distances. This introduces retinal image differences of quite undesirable nature, especially if the televised scene is at considerable distance from the transmitting apparatus.

As well known, the fluorescent screens of television tubes are either of the transmission or the reflection type, the former, because not very bright, being mainly used for direct observation through the flat end portion of the cathode ray tube, whereas the latter, which is much more bright, is suitable for enlarged projection on a separate optical screen outside the tube.

In accordance with the invention, the screens of television tubes are curved in accordance with the principles explained above with reference to Figs. 10 to 13, and the image carrying beam, if necessary, modified as discussed with reference to Figs. 27 and 28.

Fig. 29 shows a tube having a transmission type screen. In this figure, 15 indicates the vessel of the cathode ray tube, 16 the electron beam and 17 the face of the tube which is observed binocularly by eyes L and R. In accordance with the invention, face 17 is curved as indicated by meridians 18 and 19. The exact curvature of face 17 and of the fluorescent screen therebehind will of course depend upon the particular conditions for which the tube is designed, especially the observation distance. However, with the aid of the above-explained principles it is easy to compute the proper curvatures for any particular television viewing installation, and to modify the electron beam as explained below with reference to Fig. 30.

In Fig. 30, a conventional television tube 30 with electron beam 31 and reflecting fluorescent screen 32 produces an image that is projected by lens system 33 onto a translucent screen 34 curved in accordance with the invention.

In order to introduce the necessary distortion of the image-carrying light beams 14 (Fig. 29) or 35 (Fig. 30) as explained with reference to Figs. 27 and 28, various possibilities are contemplated in accordance with the invention. This distortion can be introduced by a modified lens system 33 projecting an undistorted fluorescent screen image, or by curving the fluorescent screen 17 or 32 in order to produce the required barrel or composite distortion, or by electrically distorting the fluorescent image pattern.

The nature of the first two expedients will be evident from the explanations referring to Figs. 27 and 28; the third expedient is now well known in the electronic art as for example used for eliminating the keystone effect introduced by tubes of the type illustrated in Fig. 30. This is accomplished by appropriately controlling the scanning circuits with conventional means.

If rear projection is not contemplated, as for example if a reflecting screen as in Fig. 30 is observed directly or projected onto the front of an observation screen, the provisions for rear projection according to Figs. 27 and 28 are of course unnecessary.

*Motion pictures of close-up as well as distant scenes projected upon the front of curved screens at intermediate distance.*—The problem of stereoscopically presenting nearby scenes such as close-up portraits and interiors, of mid-distance architecture, as well as of distant scenery, arises especially in connection with large motion picture houses having correspondingly large screens upon which conventionally projected nearby scenes appear even more unnatural than distant landscapes.

Proper depth separation of the detail of such scenes is provided by eliminating the basis of binocular depth discrimination and rendering only uniocular clues effective, according to the principles above described.

Such an arrangement will substantially eliminate the asymmetry and cyclo effects that are instrumental in producing binocular depth perception, thereby giving full scope to the clues for uniocular depth differentiation. It will be obvious that these dimensions will vary with the particular auditorium conditions; however it is not at all difficult to derive the correct dimensions with the aid of the above-explained concepts on which the present invention is based.

*Pictures of distant scenes projected on less distant flat screens and observed through spectacles affecting the retinal image relation.*—Coming now to practical embodiments of that aspect of the invention which employs observation lens expedients, an example of motion or still picture projection on a screen nearer than the original object will first be described with reference to Fig. 31.

In Fig. 31, a conventional flat screen 35 is arranged at a distance of six feet from the observer L, R, who sees a conventional motion (or still) picture record of a practically infinitely distant scene projected on this screen with conventional projection apparatus, through glasses made according to the following prescription:

4 Δ prisms, base out, next to the eye, on a 12D spherical base curve, convex to the eye, tipped 20° top out; at 46 of Fig. 31.

4 Δ prisms, base in, on a 6D spherical base curve, concave to the eye, tipped 20° top out; at 48 of Fig. 31.

It will be observed that in this instance the static cyclo effect is introduced by tipping the prism systems.

*Pictures of near scenes projected on more dis-*

*tant flat screens and observed through spectacles affecting the retinal image relation.*—This embodiment is illustrated in Fig. 32 which indicates an observation screen at a distance of about six feet, for observation of scenes taken from as near as sixteen inches. Otherwise this figure is closely analogous to Fig. 31. It incorporates the following prescription:

4 Δ prisms, base in, next to the eye, on a 12D spherical base curve, convex to the eye; at 36 of Fig. 32.

4 Δ prisms, base out, on a 6D spherical base curve, concave to the eye; at 37 of Fig. 32.

2% meridional zero power magnification lens, axes 45° outward on top; at 38 of Fig. 32.

*Pictures projected on curved screens and observed through spectacles affecting the retinal image relation.*—It may sometimes be advantageous to utilize the effects, according to the invention, of both curved screens and observation spectacles. This combination permits, on the one hand, the use of a screen that is curved in only one direction, and on the other hand a comparatively simple spectacle lens combination. The embodiment according to Figs. 33 and 34 illustrates the introduction of the dynamic cyclo effect for observation of a near scene on a distant screen, if it is not desired to use doubly curved prism systems.

In these figures, 60 is a cylindrical screen placed at about six feet from the eyes convexly thereto, and having a radius of about six feet centered approximately on a horizontal plane through the centers of rotation of the eyes. The spectacle system, consisting of prisms 66 and 67, has the following prescription:

4 Δ prisms, base in, next to the eye, on a 12 cylindrical axis vertical base curve, convex to the eye; at 66 of Fig. 34.

4 Δ prisms base out on a 6D cylindrical axis vertical base curve concave to the eye; at 67 of Fig. 34.

If desired, this system may be combined with oblique size cylinders, or tipped, in order to introduce the static cyclo effect, as above described.

It should be understood that the present disclosure is for the purpose of illustration only and that this invention includes all modifications and equivalents which fall within the scope of the appended claims.

I claim:

1. In the art of stereoscopic representation of pictures, viewing apparatus which comprises means for projecting an optical image from a record, a projection screen arranged substantially in said image, and means for localizing an observer opposite said screen for viewing said image, said screen being horizontally concave towards the observer on curves essentially coinciding with Vieth-Müller circles of the observer, and vertically concave on curves substantially coinciding with circles centered on a point on the observer's side of the screen and in the observer's median plane at a distance from the screen which distance is essentially equal to the observer's distance from the screen.

2. Apparatus according to claim 1 wherein said point is also on a line which is slightly inclined to the observer's line of vision and which intersects said line of vision essentially at the screen.

3. Apparatus according to claim 1 wherein a horizontal curve on a selected line of vision is essentially a Vieth-Müller circle, wherein on lines of vision above said selected line of vision said horizontal curves have decreasing curvatures, and wherein on lines of vision below said first line of vision said horizontal curves have increasing curvatures.

4. Apparatus according to claim 1 wherein said screen is translucent, said projecting means is arranged on the convex side of said screen opposite to the concave side facing the observer, and said projecting means includes means for modifying the image carrying beam of the projecting means such as to produce on said screen an image essentially similar to an image produced on the screen by said projection means with an unmodified beam and placed at essentially the same distance at the concave side of the screen.

5. Apparatus according to claim 1 wherein said record is the light emitting screen of a television tube and said projection screen is translucent and placed between said tube and the observer with its convex side facing the tube and the concave side facing the observer, to receive light on its convex side from the tube for observation from the concave side, and wherein said projecting means includes means for modifying the image carrying beam of the emitting screen such as to produce on said projection screen an image essentially similar to an image produced on the projection screen by said projection means with an unmodified beam and placed at essentially the same distance at the concave side of the projection screen.

ADELBERT AMES, Jr.

REFERENCES CITED

The following references are of record in the file of this patent:

UNITED STATES PATENTS

| Number | Name | Date |
|---|---|---|
| 1,330,447 | Pech | Feb. 10, 1920 |
| 1,419,901 | Wyld | June 13, 1922 |
| 1,636,450 | Ames, Jr. | July 19, 1927 |
| 1,935,220 | Wildhaber | Nov. 14, 1933 |
| 1,955,273 | Dennison | Apr. 17, 1934 |
| 2,045,120 | Carpenter | June 23, 1936 |
| 2,075,853 | Kanolt | Apr. 6, 1937 |
| 2,084,795 | Donle | June 22, 1937 |
| 2,118,132 | Ames, Jr., et al. | May 24, 1938 |
| 2,166,399 | Dowsett et al. | July 18, 1939 |
| 2,172,775 | Schmidt-Orr et al. | Sept. 12, 1939 |
| 2,251,850 | Mendez | Aug. 5, 1941 |
| 2,252,467 | Luzzatti | Aug. 12, 1941 |
| 2,292,979 | Wald | Aug. 11, 1942 |
| 2,297,322 | Rasco | Sept. 29, 1942 |
| 2,301,254 | Carnahan | Nov. 10, 1942 |
| 2,307,210 | Goldsmith | Jan. 5, 1943 |
| 2,320,760 | Surre | June 1, 1943 |
| 2,321,894 | Bischoff | June 15, 1943 |
| 2,348,818 | Jacobson | May 16, 1944 |

FOREIGN PATENTS

| Number | Country | Date |
|---|---|---|
| 149,633 | Great Britain | July 28, 1920 |
| 183,441 | Great Britain | July 12, 1923 |
| 671,464 | France | Sept. 2, 1929 |
| 443,788 | Great Britain | Mar. 5, 1936 |
| 457,274 | Great Britain | Nov. 24, 1936 |
| 345,800 | Italy | Jan. 16, 1937 |

OTHER REFERENCES

Helmholtz, "Physiological Optics," volume 3, published by the Optical Society of America, 1925, pp. 488–490, 421–429 and 484. (Copy in Div. 7.)